United States Patent [19]

Clemons et al.

[11] 3,859,545

[45] Jan. 7, 1975

[54] LOW POWER DYNAMIC CONTROL CIRCUITRY

[75] Inventors: Donald Gordon Clemons, Walnutport; Paul Robert Schroeder, Wescosville, both of Pa.

[73] Assignee: Bell Telephone Laboratories, Incorporated, Murray Hill, N.J.

[22] Filed: Dec. 10, 1973

[21] Appl. No.: 423,297

[52] U.S. Cl. .................. 307/296, 307/240, 307/246, 307/251, 307/270

[51] Int. Cl. ......................... H03k 3/33, H03k 17/04

[58] Field of Search ........... 307/238, 240, 246, 251, 307/264, 279, 270, 296, 304

[56] References Cited

UNITED STATES PATENTS

| | | | | |
|---|---|---|---|---|
| 3,593,037 | 7/1971 | Hoff, Jr. | 307/238 | |
| 3,601,624 | 8/1971 | Hayes | 307/264 | X |
| 3,691,537 | 9/1972 | Burgess et al. | 307/238 | X |
| 3,706,079 | 12/1972 | Vadasz et al. | 307/279 | X |
| 3,778,784 | 12/1973 | Karp et al. | 307/279 | X |
| R27,305 | 3/1972 | Polkinghorn et al. | 307/279 | X |

FOREIGN PATENTS OR APPLICATIONS

| | | | |
|---|---|---|---|
| 2,026,143 | 12/1970 | Germany | 307/279 |

OTHER PUBLICATIONS

Lee, "Low-Power Dissipation FET Driver Circuit," IBM Tech. Discl. Bull., Vol. 14, No. 4, 9/1971, pp. 1084.

*Primary Examiner*—Stanley D. Miller, Jr.
*Assistant Examiner*—L. N. Anagnos
*Attorney, Agent, or Firm*—I. Ostroff

[57] ABSTRACT

Improved low-power dynamic control circuits made up of MOS transistors are utilized as part of a dynamic memory system in order to improve the operating margins of the memory system.

9 Claims, 6 Drawing Figures

LOW POWER DYNAMIC CONTROL CIRCUITRY

BACKGROUND OF THE INVENTION

This invention relates to dynamic control circuitry and, in particular, to low-power dynamic control circuits for use in a memory system of the kind described in a U.S. patent application, Ser. No. 423,295, (filed Dec. 10, 1973), J. T. Koo 9, which is being filed concurrently with this application, and in which there is a common assignee.

The Koo memory system utilizes low-power dynamic circuitry which is automatically timed by internally created control signals and externally applied control signals. This memory systen has been fabricated on a single integrated circuit chip and subsequent testing has shown it to be fully operational. It has, however, been discovered that the output signals of certain of the control circuits can be somewhat attenuated by variations in the fall time of the clock signal, and that the output signal of another control circuit can be partially attenuated due to capacitive coupling between input and output. Accordingly, it is desirable to widen the operating margins.

OBJECTS OF INVENTION

It is a specific object of this invention to provide control circuits suitable for use with a memory system of the Koo kind so as to provide wider operating margins. It is of course feasible that such control circuits may prove useful with other forms of memories also.

SUMMARY OF THE INVENTION

This and other objects of the invention are attained in a voltage pulse generator circuit which comprises four branch circuits and at least two capacitances. Each of the first three branches comprises three ports. The first port of the first branch is coupled to a power supply, +Vss, and the second port is coupled to the first port of the second branch. A first capacitance is coupled between the first port and the third or control port of the second branch. The second port of the second branch is coupled to ground potential. The second port of the third branch is coupled to the third or control port of the second branch. The third branch is adapted to selectively isolate or couple the first port thereof to the control port of the second branch. The fourth branch includes the second capacitance and is coupled to the first port and the control port of the third branch. The fourth branch controls the operation of the third branch.

In operation, input control signals are applied to the first, third and fourth branches. Initially the first branch appears as a short circuit and the +Vss applied to the first port thereof is coupled to the second port which serves as the circuit output. At this point in time the fourth branch allows a control signal applied to the first port of the third branch to be coupled to the control port of the second branch. This signal causes the second branch to appear as an essentially open circuit between the first and second ports thereof. The output signal is thus maintained at +Vss, which is defined as a "0" level. Next, the input signals are inverted. This causes the first branch to appear as an open circuit such that the second port is no longer held at +Vss. In addition, the third and fourth branches cause the second branch to appear as a short circuit. Consequently, the potential of the second port of the first branch discharges from +Vss to essentially ground potential, which is defined as a "1" level. The input signals are now returned to the initial levels and all initial conditions are reestablished.

The addition of two field effect transistors to the just described voltage pulse generator circuit results in a further improved voltage pulse generator which can be used directly in the aforementioned Koo memory system.

Moreover, if seven more field effect transistors are added to the further improved voltage pulse generator circuit, another voltage pulse generator circuit, which can be used directly in the aforementioned Koo memory system, is created.

These and other objects, features and advantages of the invention will be better understood from a consideration of the following detailed description taken in conjunction with the following drawings.

DETAILED DESCRIPTION OF THE DRAWING

Figure 1:
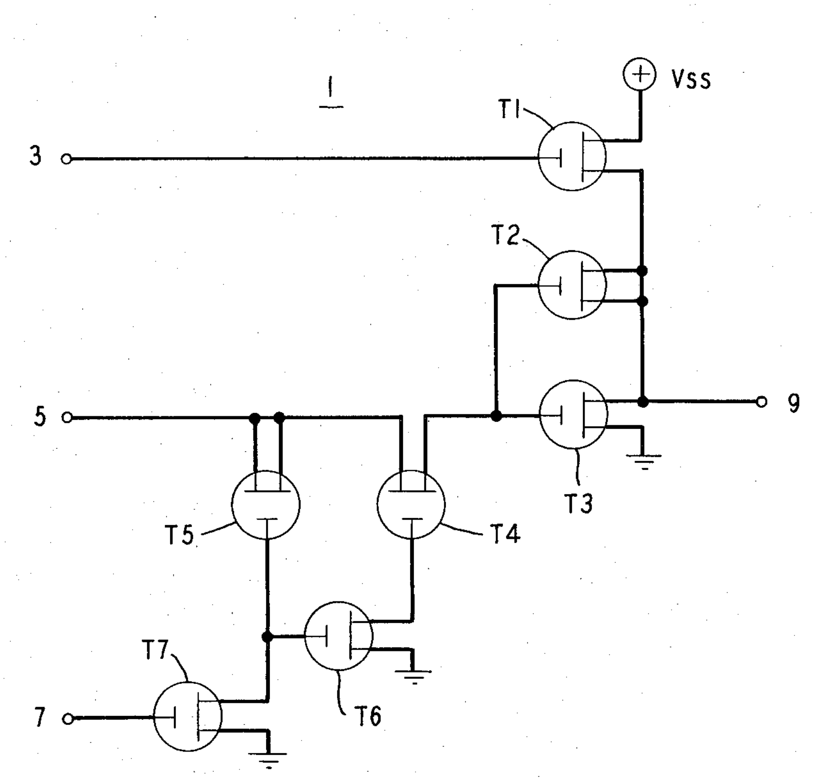
FIG. 1 illustrates the basic elements of a voltage generator circuit in accordance with an illustrative embodiment of this invention.

Now referring to FIG. 1, there is illustrated a voltage pulse generator circuit 1 which comprises seven p-channel type insulated gate field effect transistors T1–T7. The source and gate of T1 are coupled to a power supply +Vss and a terminal 3, respectively. The drain of T1 is coupled to the source and drain of T2, the source of T3, and a terminal 9. The gate of T2 is coupled to the gate of T3 and the drain of T4. The source of T4 is coupled to the drain and source of T5 and to a terminal 5. The gate of T7 is coupled to a terminal 7. The drains of T6, T3 and T7 are all coupled to ground potential. Terminal 9 serves as the output terminal and terminals 3, 5 and 7 serve as input terminals.

Figure 2:
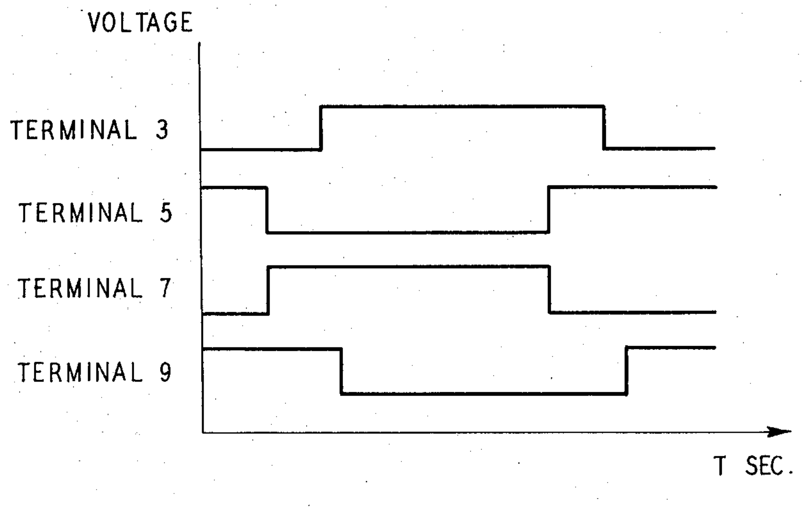
FIG. 2 graphically illustrates typical input waveforms and the resulting output waveform of the circuit of FIG. 1.

The waveforms applied to terminals 3, 5 and 7, and the resulting output waveform at terminal 9, are illustrated in FIG. 2, all as a function of time. Initially, terminal 5 is at a "0" level (typically +16 volts) and terminals 3 and 7 are at "1" levels (typically ground potential). These conditions cause T7 to be enabled, and thus the gates of T5 and T6 to be set to a potential of one threshold (1 Vt) above the level of the "1" applied to terminal 7. This causes T5 and T6 to be enabled. Consequently, T4 is enabled since the potential at the gate of T4 assumes a value of +2Vt above ground potential. The gate of T3 is charged to a "0 " level since T4 is enabled and terminal 5 is at the "0 " level. Thus, T4 is disabled. T1 is enabled since the potential of the gate (terminal 3) is held at a "1" level. Consequently, output terminal 9 is changed to +Vss, a "0" level. At this point in time no dc steady state current flows.

Now terminal 5 is pulsed in potential to a "1" level and then terminal 7 is pulsed to a "0" level. The pulsing of terminal 7 from a "1" to a "0" level disables T7. T5, which is connected as a capacitor, was enabled prior hereto and therefore the capacitance thereof is greater than the case when T5 is disabled. Therefore, the pulsing of terminal 5 from a "0" to a "1" causes the gate of T6 to be pulsed to a negative potential.

At the same time as above, T4 serves as a capacitive couple between terminal 5 and the gate of T4. Consequently, the drop in potential of terminal 5 results in a negative excursion in the potential of the gate of T4. This causes the gate of T3 to be forced to very rapidly discharge to essentially the level of the "1" applied at terminal 5. The gate of T4 does not remain at a negative potential but recovers to ground potential because of enabled T6. Depending on the relative time constants of the nodes associated with the gates of T3 and T4, and the fall time of the pulse applied to terminal 5, the potential reached by the node associated with the gate of T3 is somewhere between ground potential and +1Vt above ground potential.

T1 and T3 are both enabled at this point in time and, consequently a dc flow of current is established from +Vss through T1 and T3 to ground potential. While dc current flows the potential of terminal 9 stays at essentially +Vss since the physical geometry of T1 is greater than that of T3.

A short period of time later, the potential of terminal 3 is pulsed from a "1" to a "0". This disables T1 and thus allows terminal 9 to discharge through enabled T3. Because of the capacitive effect of enabled T2, the drop in potential of terminal 9 is coupled to the gate of T3. This more heavily enables T3 and allows for the rapid discharge of terminal 9 to a "1" level. The potential applied to terminal 5 can, even though it ideally does not, go as far positive as +1Vt above ground potential without affecting the potential of the gate of T3. As will be illustrated later, additional circuitry can be added to the circuitry of FIG. 1 to insure that at this time that the gate of T3 is completely isolated from terminal 5.

Now the potentials of terminals 5 and 7 are pulsed back to the original levels and then the potential of terminal 3 is pulsed back to the original level. The returning of terminals 3, 5 and 7 to the initial levels causes terminal 9 to again charge through T1 to +Vss and T5, T6 and T7 to again be enabled.

The circuit 1 of FIG. 1 may be viewed as comprising four branch circuits and two capacitances. T1, T3 and T4 comprise the first, second and third branch circuits, respectively. The fourth circuit branch comprises T5, which performs a capacitance function, T6 and T7. T2 performs the other capacitance function.

Figure 3:
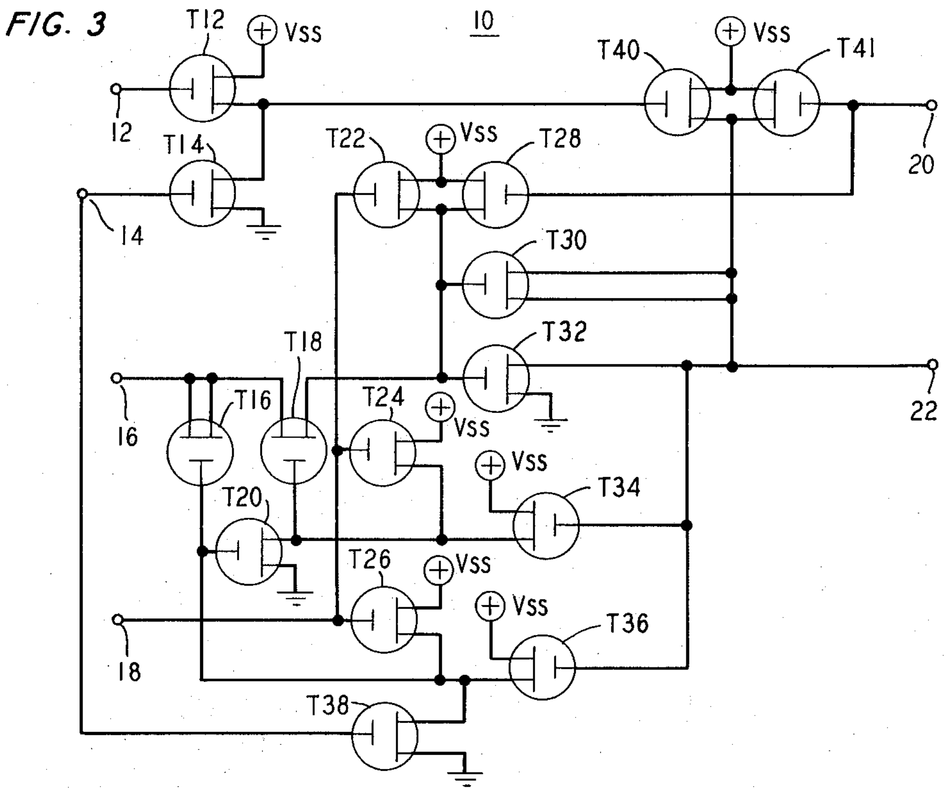
FIG. 3 illustrates another voltage generator circuit in accordance with this invention.

Now referring to FIG. 3, there is illustrated a voltage generator circuit 10 which comprises sixteen transistors, T12–T41. The transistors are illustrated as p-channel, insulated gate field effect transistors. The source of T12, T40, T41, T22, T28, T24, T34, T26 and T36 are all coupled to a power supply +Vss. The drains of T14, T20, T32, and T38 are all coupled to ground potential. The drain of T12 is coupled to the gate of T40 and the source of T14. The drains of T40 and T41 are coupled together and are coupled to the drain and source of T30, the source of T32, an output terminal 22, and the gates of T34 and T36. The gate of T41 is coupled to a terminal 20 and to the gate of T28. The drains of T22 and T28 are coupled together and are coupled to the gates of T30 and T32 and to the drain of T18. The source of T18 is coupled to the drain and source of T16 and to a terminal 16. The gate of T18 is coupled to the drains of T24 and T34 and to the source of T20. The drain of T26 is coupled to the drain of T36, the source of T38, and to the gates of T20 and T16. The gate of T12 is coupled to an input terminal 12. The gates of T38 and T14 are coupled to an input terminal 14, and the gates of T22, T24 and T26 are coupled to an input terminal 18.

Transistors T40, T30, T32, T18, T16, T20 and T38 are coupled together to form the same basic circuit configuration as transistors T1–T7 of FIG. 1.

The voltage generator circuit 10 represents an improvement over the CWA/CWB generator circuit 136 of FIG. 13 of the aforementioned KOO copending application. It will be convenient to discuss this voltage generator circuit 10 specifically for use with a memory of the kind described in the copending Koo application. In this case, the A4, $\overline{A4}$, C, $\overline{C}$ and EOC signals utilized in the Koo memory system would essentially be employed as the inputs to circuit 10. The $\overline{A4}$ signal is not always the true complement of the A4 signal. In order to obtain a CWA output signal at terminal 22, an A4 signal is applied to terminal 12, a $\overline{C}$ is applied to terminal 14, a C signal is applied to terminal 16, an EOC signal is applied to terminal 20, and an $\overline{A4}$ signal is applied to terminal 18. To obtain a CWB output signal at terminal 22 the C, $\overline{C}$, and EOC signals are applied to the same terminals as described above but the $\overline{A4}$ signal is applied to terminal 12 and the A4 signal is applied to terminal 18.

Figure 4:
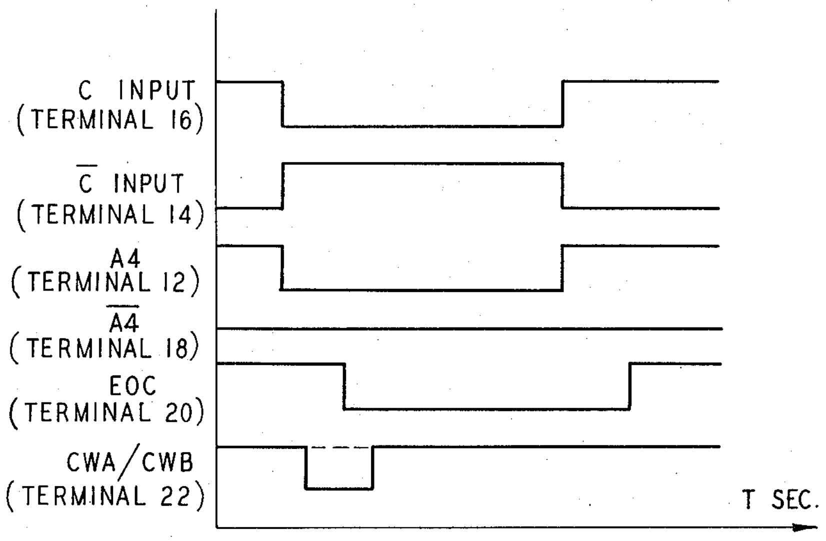
FIG. 4 graphically illustrates typical input waveforms and the resulting output waveform of the circuit of FIG. 3.

The C, $\overline{C}$, EOC, A4, and $\overline{A4}$ input waveforms and the resulting CWA/CWB output waveforms are graphically illustrated in FIG. 4 all as a function of time. Initially C is a "0" (typically +16 volts), $\overline{C}$ is a "1" (typically 0 volts) and EOC, A4 and $\overline{A4}$ are all initially "0"s. These conditions cause T14 to be enabled. This causes the gate T40 to assume a potential of +1Vt above the potential of the gate of T14. The potential of the gate of T14 at this point in time is typically ground potential (0 volts). Thus T40 is enabled. T38 is also enabled and, accordingly, T16 and T20 are enabled. Therefore, the source of T20 assumes a potential of +2Vt above ground potential. This condition enables T18. The "0" applied to terminal 16 is thus applied via enabled T18 to the gate of T32. This disables T32. Since, as has been discussed, T40 is enabled, terminal 22 is charged to +Vss. T34, T36, T41, T22, T28, T24, T26 and T12 are all disabled initially because a "0" level is applied to all of the respective gates. Therefore, no dc path exists between +Vss and ground potential and, accordingly, no dc current flows.

Now C is pulsed to a "1", $\overline{C}$ is pulsed to a "0" and A4 or $\overline{A4}$ is pulsed to a "1". Two complete circuits 10 of the present invention are utilized with the Koo memory. One circuit 10 creates the CWA signal and the other creates the CWB signal. The operation of the Koo memory requires that either CWA or CWB be pulsed from a "0" to a "1" while the other is held at a "0". If, for example, it is desired to cause CWA to be pulsed to a "1" and CWB to be held at a "0" level, A4 is pulsed from a "0" level to a "1" level, $\overline{A4}$ is held at a "0" level, C is pulsed from a "0" level to a "1" level and $\overline{C}$ is pulsed to a "0" level from a "1" level. While FIG. 4 illustrates that C, $\overline{C}$, and A4 are all essentially pulsed at the same time, in the actual operation of the Koo memory C is pulsed first and then $\overline{C}$ and A4 are pulsed.

This new condition causes T14 to be disabled and T12 to be enabled. Thus the gate of T40 is charged to +Vss and therefore T40 is disabled. T38 is now disabled and, due to the capacitive effects of T16, the gate of T20 is pulsed to a negative potential. This allows T20 to remain enabled but the potential of the source thereof is reduced from +2Vt to ground potential. Since T18 is enabled, the gate of T32 is discharged from a "0" level to +1Vt above ground potential.

Enabled T18 serves as a capacitive couple between terminal 16 and the gate of T18. Accordingly, the negative going C pulse applied to terminal 16 causes the gate of T18 to initially go more negative than ground potential. This causes the gate of T32 to very rapidly discharge to essentially the level of the "1" input signal applied at terminal 16. The gate of T18 does not stay at a negative potential but is set to ground potential because of enabled T20. The relative time constants of the nodes associated with the gates of T18 and T32, as well as the fall time of the C signal, determine to what precise level between +1Vt and ground potential the gate of T32 is set. It is desirable but not essential that the potential of the gate of T32 be set to ground and not +1Vt. This is because, as will be explained shortly, when terminal 22 discharges, T32 is more heavily enabled and, therefore, the fall time of the output signal at terminal 22 is improved. In addition, the initial negative potential of the gate of T18 causes the gate of T32 to more rapidly be set to the desired level than is the case if there is no such negative potential. T32 is thus enabled since the potential of the gate thereof is set to a level somewhere between +1Vt and ground potential.

Due to the fact that A4 in the actual operation stays at a "0" for some short period of time after C goes to a "1", T40 and T32 are both enabled and consequently dc power flows from +Vss through T40 and T32 to ground potential. The power dissipated is relatively low because this time interval is relatively short. The output signal level at terminal 22 is maintained at essentially the +Vss level because the physical geometry of T40 is greater than that of T32.

Terminal 22 now discharges from a "0" level through enabled T32. Since terminal 22 is coupled to enabled T30, which is connected as a capacitor, the drop in terminal 22 voltage is coupled to the gate of T32. This feedback causes T32 to conduct heavily and thereby rapidly discharges terminal 22 from a "0" to a "1". Thus the CWA output (terminal 22) has been pulsed to the "1" level as is required for operation of the memory system of J. T. Koo 9.

As terminal 22 reaches a "1" level, T34 and T36 are enabled. This causes the gates of T18 and T20 to rise in potential to +Vss and thereby disables T18 and T20. This insures that there are no dc paths at this time.

At a desired time later, the EOC input signal applied to terminal 20 is pulsed from a "0" to a "1". This enables T41 and T28 and thus causes terminal 22 and the gate of T32 to charge up to +Vss, the "0" level. The returning of the gate of T32 to a "0" disables T32 and therefore there can be no steady state current flow through T41 and T32. Thus, as is desired, the CWA signal appearing at terminal 22 has been pulsed to "1" and then back to a "0".

At a desired time after the CWA signal has been returned to the "0" level, C is returned to the initial "0" level. $\overline{C}$ is returned to the initial "1" level, and the EOC signal is returned to the initial "0" level. This set of conditions resets all internal nodes to the initial conditions first described.

If it is desired that the CWA signal appearing at terminal 22 remain at the "0" level, then the A4 signal is not pulsed but remains at the "0" level. Thus T12 is not enabled and the gate T40 floats in potential at 1Vt after $\overline{C}$ is pulsed from the initial "1" level to the "0" level. This maintains T40 in the enabled state. The $\overline{A4}$ input at terminal 18 is pulsed to a "1" from an initial "0" level and thus T22 is enabled. This disables T32 because the gate of T32 is charged to +Vss, a "0". Thus T32 is disabled and terminal 22 stays charged to +Vss, a "1", since T40 is enabled. The $\overline{A4}$ input signal coupled to terminal 18 enables T24 and T26 and thus disables T18 and T20. Thus when C is pulsed from the initial "0" level to the "1" level, T18 is disabled and consequently the potential of the gate of T32 is not allowed to assume a "1" level as C assumes, but is held at a "0" level by enabled T22. The disabling of T18 and T20 insures against any dc current paths.

The embodiment of FIG. 3 has been substituted for the circuit 136 of the J. T. Koo 9 copending application. The resulting memory system has been fabricated on a single integrated circuit chip using p-channel insulated field effect transistors.

Figure 5:
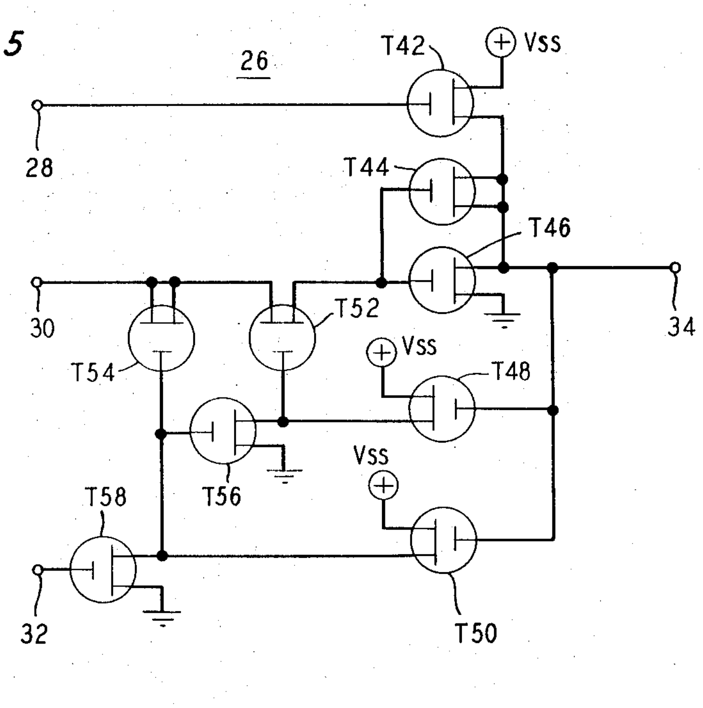
FIG. 5 graphically illustrates still another voltage generator circuit in accordance with this invention.

Now referring to FIG. 5, there is illustrated an embodiment of a voltage generator circuit 26 which comprises nine p-channel insulated gate field effect transistors, T42–T58. The source, gate and drain of T42 are coupled to +Vss, terminal 28, and the drain and source of T44, respectively. The drain and source of T44 are coupled to the source of T46, terminal 34, and the gates of T48 and T50. The gate of T44 is coupled to the gate of T46 and the drain of T52. The drain of T46 is coupled to ground potential. The source of T48 is coupled to +Vss. The drain of T48 is coupled to the gate of T52 and the source of T56. The drains, T56 and T58, are both coupled to ground potential. The gate of T56 is coupled to the gate of T54, the source of T58, and the drain of T50. The source of T50 is coupled to +Vss. The gate of T58 is coupled to terminal 32. The source of T52 is coupled to the drain and source of T54 and to terminal 30. Terminal 34 serves as the output terminal and terminals 28, 30 and 32 serve as input terminals.

Transistors T42, T44, T46, T52, T54, T56 and T58 are coupled together to form the same basic circuit configuration as transistors T1–T7 of FIG. 1.

The voltage generator circuit 26 represents an improvement over the CSC generating circuit 66 of FIG. 9 of the aforementioned copending Koo application. It will be convenient to discuss this voltage pulse generator circuit 26 specifically for use with a memory system of the kind described in the Koo copending application.

Input signals X, C and $\overline{C}$ of the Koo memory are coupled to terminals 28, 30, and 32 of the CSC generator 26 of FIG. 5 of the present application. These input signals are utilized by the Koo memory system.

Figure 6:
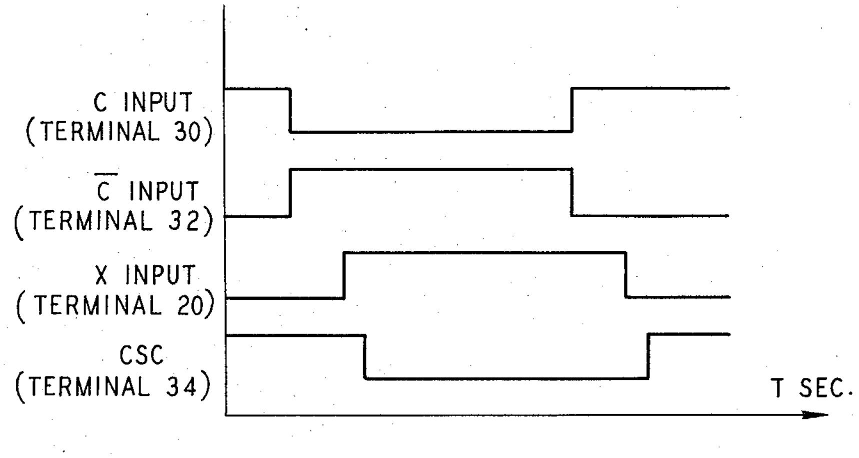
FIG. 6 graphically illustrates typical input waveforms and the resulting output waveform of the circuit of FIG. 5.

The X, C and $\overline{C}$ input waveforms and the resulting CSC output waveforms are illustrated in FIG. 6, all as a function of time. Initially, C is at a "0" level, $\overline{C}$ is at a "1" level, and X is at a "1" level. These initial conditions cause T58 to be enabled. This causes the gates of T54 and T56 to be at a potential of +1Vt above $\overline{C}$, (that of the level of which is essentially at ground potential). This causes T54 and T56 to be enabled. Consequently, T52 is enabled since the potential of the gate of T52 assumes a potential of +2Vt above ground potential. The gate of T46 is charged to a "0" level since T52 is enabled and the C input at terminal 30 is at "0" level. Thus T46 is disabled. T42 is enabled since the gate is held at a "1" level. Consequently, output terminal 34 is charged to +Vss, a "0" level. At this point in time no dc steady state current flows.

Now the C input signal is pulsed to a "1" level and then the $\overline{C}$ input signal is pulsed to a "0" level. The pulsing of the $\overline{C}$ signal from a "1" to a "0" level disables T58. T54, which is connected as a capacitor, was enabled prior hereto and therefore the capacitance thereof is greater than is the case when T54 is disabled. Therefore, the pulsing of the C input signal from a "0" level to a "1" level causes the gate of T56 to be pulsed to a negative potential.

At the same time as above, T52 serves as a capacitive couple between terminal 30 and the gate of T52. Consequently, the drop in potential of the C signal results in a negative excursion in the potential of the gate of T52. This causes the gate of T46 to be forced to very rapidly discharge to essentially the level of the "1" input signal at terminal 30. The gate of T52 does not remain at a negative potential but recovers to ground potential because of enabled T56. Depending on the relative time constants of the nodes associated with the gates of T52 and T46, and the fall time of the C pulse, the potential reached by the node associated with the gate of T46 is somewhere between ground potential and +1Vt above ground potential. T46 is therefore enabled.

At this point in time T42 is still enabled and consequently a dc flow of current is established from +Vss through T42 and T46 to ground potential. During this period of time the potential of terminal 34 stays at essentially +Vss since the physical geometry of T42 is greater than that of T46. Various other methods exist for insuring that the output level remain at +Vss. For example, the electrical characteristics of T42 and T46 can be varied by ion implantation.

A short period of time later the X input signal is pulsed to a "0" level from the "1" level. This disables T42 and thus allows terminal 34 to discharge through T46. As the potential of terminal 34 starts to drop from +Vss, the capacitive effect of enabled transistor T44 couples this drop in potential to the gate of T46. This more heavily enables T46 and allows for the rapid discharge of terminal 34 to a "1" level (typically ground potential). As terminal 34 discharges towards the "1" level, T48 and T50 are enabled. This causes T52 and T56 to be disabled since the gates thereof are charged to +Vss, the "0" level. This effectively eliminates any possible dc path that can exist within circuit 26 at this point in time and isolates the C signal applied to terminal 30 from the gate of T46.

Now the C input signal is pulsed to the initial "0" level and the $\overline{C}$ signal is then pulsed to the initial "1" level. Next, the X signal is pulsed back to the initial "1" level. The combination of these three changes back to the initial levels causes terminal 34 to once again charge through enabled T42 to +Vss and T56 and T52 to again be enabled.

It is to be understood that the embodiments described herein are merely illustrative of the general principles of the invention. Various modifications are possible within the scope of the invention. For example, n-channel insulated gate field effect transistors can be substituted for the p-channel insulated field effect transistors provided all the operating voltages are appropriately adjusted.

While it is particularly advantageous to have the voltage generator circuit described integrated in the same semiconductive chip as the memory it serves, in special instances it may be appropriate to form it in a separate chip.

What is claimed is:

1. A circuit comprising:

a first circuit means comprising a control port, a first port, and a second port;

the first circuit means being adapted to selectively appear as an essentially open or short circuit;

a second circuit means comprising a control port, a first port, and a second port;

the second circuit means being adapted to selectively appear as an essentially open or short circuit;

the second port of the first means being coupled to the first port of the second means;

a first capacitive means, the first capacitive means being coupled between the first port and the control port of the second means;

a third circuit means comprising a control port, a first port and a second port;

the second port of the third circuit means being coupled to the control port of the second means, said third circuit means being adapted to selectively isolate or couple the first port of the third means to the control port of the second means;

fourth circuit means, including second capacitive means, coupled to the first port and the control port of the third means for selectively controlling when the third circuit means isolates or couples the first port of the third circuit means to the control port of the second circuit means;

the control port of the first circuit means being adapted to serve as an input port;

the first port of the second circuit means being adapted to serve as an output port;

the first port of the third circuit means being adapted to serve as an input port;

an input port being coupled to the fourth circuit means; and the first port of the first circuit means, the second port of the second circuit means, and the fourth circuit means being adapted to be coupled to power supply means.

2. The apparatus of claim 1 wherein:

the first, second and third circuit means are first, second and third field effect transistors, respectively;

the first capacitive means comprises a fourth field effect transistor in which the drain and source are coupled together;

the fourth circuit means comprises fifth, sixth and seventh field effect transistors, the drain and source of the fifth transistor being coupled together and being coupled to the source of the third transistor, the source of the sixth transistor being coupled to the gate of the third transistor, the source of the seventh transistor being coupled to the gates of the fifth and sixth transistors;

the gate of the seventh transistor being adapted to serve as an input port; and the drains of the sixth and seventh transistors being adapted to be coupled to a power supply means.

3. The apparatus of claim 2 further comprising:

eighth and ninth field effect transistors;

a third capacitive means coupled between the source and gate of the third transistor;

the drain of the eighth transistor being coupled to the gate of the third transistor;

the drain of the ninth transistor being coupled to the source of the seventh transistor; and the sources of the eighth and ninth transistors being adapted to be coupled to a power supply means.

4. The apparatus of claim 3 further comprising:

tenth, eleventh, twelfth, thirteenth, fourteenth, fifteenth and sixteenth field effect transistors;

the drain of the tenth transistor being coupled to the source of the eleventh transistor and the gate of the first transistor;

the source and drain of the twelfth transistor being coupled respectively to the source and drain of the first transistor, respectively;

the gate of the twelfth transistor being coupled to the gate of the fourteenth transistor;

the sources of the thirteenth and fourteenth transistors being coupled together and the drains of the thirteenth and fourteenth transistors being coupled together and being coupled to the gate of the second transistor;

the gates of the thirteenth, fifteenth and sixteenth transistors being coupled together;

the drain of the fifteenth transistor being coupled to the gate of the third transistor;

the drain of the sixteenth transistor being coupled to the source of the seventh transistor;

the gates of the tenth, twelfth, and sixteenth transistors all being adapted to serve as input ports, the tenth and eleventh transistors serving as buffers between any input signals applied thereto and the input port of the first transistor; and the sources of the tenth, twelfth, thirteenth, fourteenth, fifteenth and sixteenth transistors and the drain of the eleventh transistor all being adapted to be coupled to a power supply means.

5. A generator circuit comprising:

sixteen transistors, T1–T16, each of the transistors comprising a first terminal, a second terminal and a control terminal;

the second terminal of T1 being coupled to the first terminal of T2 and to the control terminal of T3;

the first terminals of T3 and T4 being coupled together;

the second terminals of T3 and T4 being coupled together and being coupled to the first and second terminals of T5, the first terminal of T6 and the control terminals of T7 and T8;

the first terminals of T9 and T10 being coupled together, the second terminals of T9 and T10 being coupled together and being coupled to the control terminals of T5 and T6 and the second terminal of T11;

the control terminal of T4 being coupled to the control terminal of T9;

the control terminal of T11 being coupled to the first terminal of T12 and to the second terminals of T13 and T7;

the control terminal of T13 being coupled to the control terminals of T14 and T10;

the second terminal of T14 being coupled to the second terminal of T8, the first terminal of T15 and the control terminals of T12 and T16;

the control terminals of T2 and T15 being coupled together;

the first terminal of T11 being coupled to the first and second terminals of T16;

the control terminals of T1, T2, T4, T14 and the first terminal of T11 all being adapted to serve as input terminals;

the first terminal of T6 being adapted to serve as an output terminal;

the first terminals of T1, T3, T4, T7, T8, T9, T10, T13 and T14 and the second terminals of T2, T6, T12 and T15 all being adapted to be coupled to power supply means.

6. The apparatus of claim 5 wherein the transistors are field effect-type transistors.

7. A generator circuit comprising:

nine transistors, T1–T9, each of the transistors comprising a first terminal, a second terminal and a control terminal;

the second terminal of T1 being coupled to the first and second terminals of T2, the first terminal of T3, and the control terminals of T4 and T5;

the control terminal of T2 being coupled to the control terminal of T3 and the second terminal of T6;

the control terminal of T6 being coupled to the first terminal of T7 and the second terminal of T4;

the second terminal of T5 being coupled to the first terminal of T8 and to the control terminals of T7 ad T9;

the first terminal of T6 being coupled to the first and second terminals of T9;

the control terminals of T1 and T8 and the first terminal of T6 all being adapted to serve as input terminals;

the first terminal of T3 being adapted to serve as an output terminal; and the first terminals of T1, T4 and T5 and the second terminals of T3, T7 and T8 all being adapted to be coupled to power supply means.

8. The apparatus of claim 7 wherein the transistors are field effect-type transistors.

9. A circuit comprising:

seven transistors, T1–T7, each of the transistors comprising a first terminal, a second terminal and a control terminal;

the second terminal of T1 being coupled to the first and second terminals of T2, and the first terminal of T3;

the control terminal of T2 being coupled to the control terminal of T3 and the second terminal of T4;

the control terminal of T4 being coupled to the first terminal of T6;

the first terminal of T4 being coupled to the first and second terminals of T5;

the control terminal of T5 being coupled to the control terminal of T6 and the first terminal of T7;

the control terminal of T1 and T7 and the first terminal of T4 all being adapted to serve as input terminals;

the first terminal of T3 being adapted to serve as an output terminal; and the first terminal of T1 and the second terminals of T3, T6, and T7 all being adapted to be coupled to power supply means.

* * * * *